US012365329B2

United States Patent
Murakami (10) Patent No.: US 12,365,329 B2
(45) Date of Patent: Jul. 22, 2025

(54) CONTROLLER FOR HYBRID ELECTRIC VEHICLE AND METHOD FOR CONTROLLING HYBRID ELECTRIC VEHICLE

(71) Applicant: TOYOTA JIDOSHA KABUSHIKI KAISHA, Toyota (JP)

(72) Inventor: Koji Murakami, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 303 days.

(21) Appl. No.: 18/187,000

(22) Filed: Mar. 21, 2023

(65) Prior Publication Data

US 2023/0382366 A1 Nov. 30, 2023

(30) Foreign Application Priority Data

May 25, 2022 (JP) .................................. 2022-085333

(51) Int. Cl.
*B60W 20/50* (2016.01)
*B60W 10/06* (2006.01)
*B60W 10/08* (2006.01)

(52) U.S. Cl.
CPC ............ *B60W 20/50* (2013.01); *B60W 10/06* (2013.01); *B60W 10/08* (2013.01); *B60W 2510/085* (2013.01); *B60W 2710/065* (2013.01); *B60W 2710/086* (2013.01)

(58) Field of Classification Search
CPC ...... B60W 20/50; B60W 10/06; B60W 10/08; B60W 2510/085; B60W 2710/065; B60W 2710/086; B60W 20/40; F02N 11/00; F02N 11/0848; F02N 11/0825; Y02T 10/62
See application file for complete search history.

(56) References Cited

U.S. PATENT DOCUMENTS

2014/0350775 A1* 11/2014 Yagi ....................... G07C 5/008
  701/31.4
2015/0001857 A1   1/2015 Sekiguchi

FOREIGN PATENT DOCUMENTS

JP     2015-9743 A     1/2015
JP     2017-94827 A    6/2017
JP     2017094827   *  6/2017

* cited by examiner

*Primary Examiner* — Joan T Goodbody
*Assistant Examiner* — Godfrey Aleksander Maciorowski
(74) *Attorney, Agent, or Firm* — Oblon, McClelland, Maier & Neustadt, L.L.P.

(57) ABSTRACT

A controller for a hybrid electric vehicle executes an engine starting process when an execution condition for starting an engine is satisfied. The engine starting process includes a first starting process that drives a motor generator to crank the engine and a second starting process that is executed when the first starting process failed to start the engine. The second starting process includes suspending supply of power to the motor generator and then driving the motor generator to crank the engine. The controller performs a counting process that counts an occurrence of execution of the second starting process after the first starting process failed to start the engine. When the counted occurrence is greater than or equal to a determination threshold value, the controller prohibits operation of an idle reduction system of the engine even if the second starting process successfully started the engine.

8 Claims, 3 Drawing Sheets

| Crank Angle | 0-180 degree | 180-360 degree | 360-540 degree | 540-720 degree |
|---|---|---|---|---|
| Cylinder #1 | Expansion | Exhaustion | Intake | Compression |
| Cylinder #2 | Exhaustion | Intake | Compression | Expansion |
| Cylinder #3 | Compression | Expansion | Exhaustion | Intake |
| Cylinder #4 | Intake | Compression | Expansion | Exhaustion |

CONTROLLER FOR HYBRID ELECTRIC VEHICLE AND METHOD FOR CONTROLLING HYBRID ELECTRIC VEHICLE

RELATED APPLICATION

The present application claims priority of Japanese Patent Application No. 2022-085333 filed on May 25, 2022, the disclosure of which is hereby incorporated by reference herein in its entirety.

BACKGROUND

1. Field

The following description relates to a controller for a hybrid electric vehicle and a method for controlling a hybrid electric vehicle.

2. Description of Related Art

Japanese Laid-Open Patent Publication No. 2017-094827 discloses a controller for a hybrid electric vehicle including an engine, a motor generator, and a belt connecting the engine and the motor generator. When the controller determines that the motor generator failed to start the engine, the controller starts the engine with the starter.

The starter starts the engine in the following manner. First, a pinion gear of the starter meshes with a drive plate attached to a crankshaft. Then, the starter is driven by power from a battery. This rotates the crankshaft and then starts the engine. When starting the engine with the starter, a large force is applied to the drive plate. Thus, a loud noise is produced when starting the engine with the starter.

In contrast, the motor generator starts the engine more quietly than the starter. This is because the belt allows the engine to be driven more quietly than gears.

The controller prohibits operation of an idle reduction system when the motor generator failed to start the engine and then the starter successfully starts the engine. The controller permits operation of the idle reduction system as long as the motor generator successfully starts the engine.

When operation of the idle reduction system is prohibited, the engine will not be started with the starter during a trip. This reduces the likelihood of a situation in which a loud noise is produced when starting the engine with the starter. A trip corresponds to a period from when the ignition switch is switched from OFF to ON to when the ignition switch is switched from ON to OFF.

As described above, the controller starts the engine with the starter when the controller determines that the motor generator failed to start the engine. There is still room for improvement in reducing noise produced by the starter during a trip.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a controller for a hybrid electric vehicle is provided. The hybrid electric vehicle includes an engine, a motor generator, a belt connecting the engine and the motor generator, a battery configured to supply the motor generator with power, and a starter configured to start the engine. The controller includes processing circuitry configured to execute an engine starting process when an execution condition for starting the engine is satisfied. The engine starting process includes a first starting process and a second starting process. The first starting process drives the motor generator by supplying the motor generator with power from the battery to crank the engine. The second starting process is executed when the first starting process failed to start the engine. The second starting process includes reducing the supply of power from the battery to the motor generator and then driving the motor generator by increasing the supply of power from the battery to the motor generator to crank the engine. The processing circuitry is configured to perform a counting process that counts an occurrence of execution of the second starting process after the first starting process failed to start the engine. When the counted occurrence is greater than or equal to a determination threshold value, the processing circuitry is configured to prohibit operation of an idle reduction system of the engine even if the second starting process successfully started the engine. When the second starting process failed to start the engine, the processing circuitry is configured to start the engine with the starter and prohibit operation of the idle reduction system of the engine.

In another general aspect, a method for controlling a hybrid electric vehicle is provided. The hybrid electric vehicle includes an engine, a motor generator, a belt connecting the engine and the motor generator, a battery configured to supply the motor generator with power, and a starter configured to start the engine. The method includes executing an engine starting process when an execution condition for starting the engine is satisfied. The engine starting process includes a first starting process and a second starting process. The first starting process drives the motor generator by supplying the motor generator with power from the battery to crank the engine. The second starting process is executed when the first starting process failed to start the engine. The second starting process includes reducing the supply of power from the battery to the motor generator and then driving the motor generator by increasing the supply of power from the battery to the motor generator to crank the engine. The method further includes performing a counting process that counts an occurrence of execution the second starting process after the first starting process failed to start the engine. When the counted occurrence is greater than or equal to a determination threshold value, the method includes prohibiting operation of an idle reduction system of the engine even if the second starting process successfully started the engine. When the second starting process failed to start the engine, the method includes starting the engine with the starter and prohibiting operation of the idle reduction system of the engine.

Other features and aspects will be apparent from the following detailed description, the drawings, and the claims.

BRIEF DESCRIPTION OF THE DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

This description provides a comprehensive understanding of the methods, apparatuses, and/or systems described. Modifications and equivalents of the methods, apparatuses, and/or systems described are apparent to one of ordinary skill in the art. Sequences of operations are exemplary, and may be changed as apparent to one of ordinary skill in the art, with the exception of operations necessarily occurring in a certain order. Descriptions of functions and constructions that are well known to one of ordinary skill in the art may be omitted.

Exemplary embodiments may have different forms, and are not limited to the examples described. However, the examples described are thorough and complete, and convey the full scope of the disclosure to one of ordinary skill in the art.

In this specification, "at least one of A and B" should be understood to mean "only A, only B, or both A and B."

A controller 34 for a hybrid electric vehicle in accordance with an embodiment will now be described with reference to the drawings.

Structure of Hybrid Electric Vehicle 100

Figure 1:
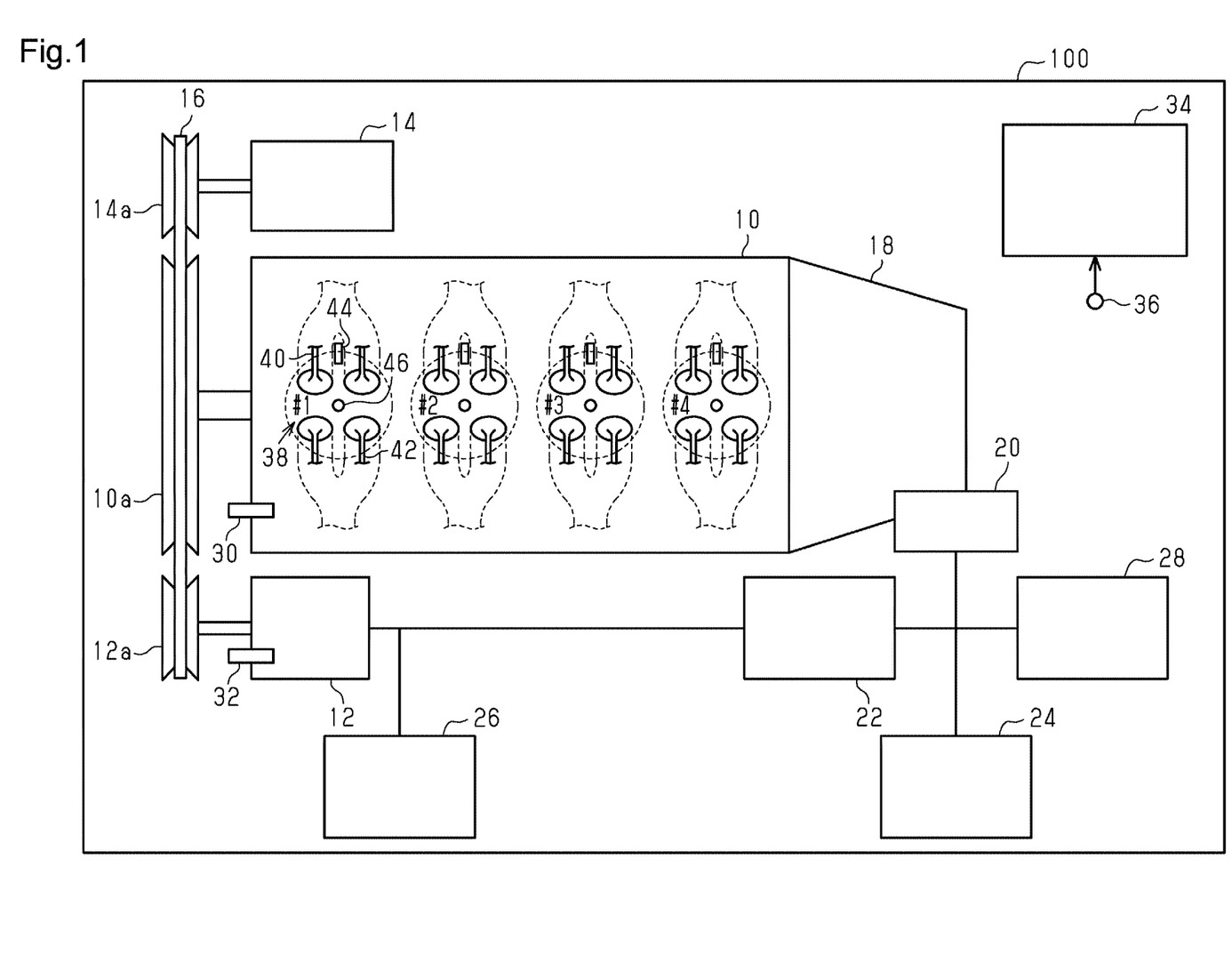
FIG. 1 is a schematic diagram showing a controller and a hybrid electric vehicle controlled by the controller in accordance with an embodiment.

FIG. 1 shows a hybrid electric vehicle (hereafter, vehicle) 100 that is controlled by the controller 34 in accordance with an embodiment. The controller 34 is mounted on the vehicle 100. The vehicle 100 includes an internal combustion engine (hereafter, engine) 10 and a motor generator 12. The vehicle 100 is provided with an air-conditioning compressor (hereafter, AC compressor) 14. The engine 10 includes a crank pulley 10a. The motor generator 12 includes a motor generator pulley 12a. The AC compressor 14 includes an AC compressor pulley 14a. A belt 16 connects the crank pulley 10a, the motor generator pulley 12a, and the AC compressor pulley 14a.

In this manner, the engine 10 and the motor generator 12 are connected to each other by the belt 16 in the vehicle 100. The controller 34 controls such a vehicle 100.

The vehicle 100 further includes a transmission 18, a starter 20, a DC-DC converter 22, an auxiliary device 24, a high-voltage battery 26, and a low-voltage battery 28. The high-voltage battery 26 is, for example, a lithium-ion battery. The low-voltage battery 28 is, for example, a lead-acid battery. The transmission 18 is connected to the engine 10. The starter 20 is connected to the transmission 18. The starter 20 is configured to drive the transmission 18. The starter 20 drives the transmission 18 to start the engine 10. The high-voltage battery 26 is connected to the motor generator 12 and the DC-DC converter 22. The motor generator 12 receives power from the high-voltage battery 26 to start the engine 10. The low-voltage battery 28 is connected to the starter 20, the DC-DC converter 22, and the auxiliary device 24.

The engine 10 includes four cylinders #1, #2, #3, and #4. In each of the cylinders #1 to #4, air is drawn into a combustion chamber 38 when an intake valve 40 opens. Fuel is injected from a fuel injection valve 44 into the combustion chamber 38. In the combustion chamber 38, an ignition device 46 produces a spark discharge to burn the air-fuel mixture. Energy generated by the combustion is extracted as rotational energy for a crankshaft of the engine 10. The crankshaft of the engine 10 is connected to the transmission 18. The combusted air-fuel mixture is discharged from the combustion chamber 38 when an exhaust valve 42 opens.

The controller 34 includes a microcomputer provided with a central processing unit (CPU), a read-only memory (ROM), a random-access memory (RAM), an input-output interface, and the like. The controller 34 uses the transitory storage functionality of the RAM to execute signal processing in accordance with programs stored in advance in the ROM. The controller 34 is configured to control the engine 10, the motor generator 12, and the like.

The engine 10 is provided with an engine rotation speed sensor 30. The controller 34 obtains an engine rotation speed, which is the rotation speed of the engine 10, from the engine rotation speed sensor 30. The motor generator 12 is provided with a motor generator rotation speed sensor 32. The controller 34 obtains a rotation speed of the motor generator 12 from the motor generator rotation speed sensor 32. The controller 34 obtains a signal from an ignition switch 36 that indicates whether the ignition switch 36 is ON or OFF.

Motor Generator 12 Successfully Starting Engine 10

An example in which the motor generator 12 starts the engine 10 when the engine rotation speed is zero will now be described.

Figure 2:
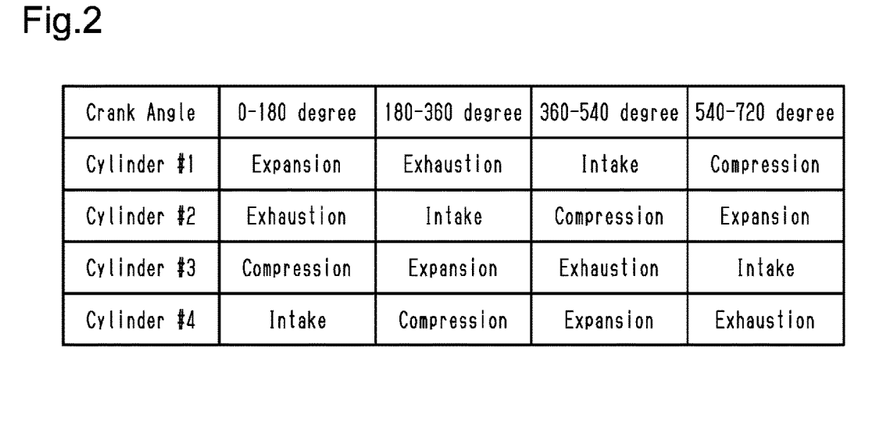
FIG. 2 is a diagram illustrating combustion cycles.

As shown in FIG. 2, when the crank angle is 0 to 180 degrees, cylinder #1 will be undergoing the expansion stroke. When the crank angle is 180 to 360 degrees, cylinder #1 will be undergoing the exhaust stroke. When the crank angle is 360 to 540 degrees, cylinder #1 will be undergoing the intake stroke. When the crank angle is 540 to 720 degrees, cylinder #1 will be undergoing the compression stroke.

As shown in FIG. 2, when the crank angle is 0 to 180 degrees, cylinder #2 will be undergoing the exhaust stroke. When the crank angle is 180 to 360 degrees, cylinder #2 will be undergoing the intake stroke. When the crank angle is 360 to 540 degrees, cylinder #2 will be undergoing the compression stroke. When the crank angle is 540 to 720 degrees, cylinder #2 will be undergoing the expansion stroke.

As shown in FIG. 2, when the crank angle is 0 to 180 degrees, cylinder #3 will be undergoing the compression stroke. When the crank angle is 180 to 360 degrees, cylinder #3 will be undergoing the expansion stroke. When the crank angle is 360 to 540 degrees, cylinder #3 will be undergoing the exhaust stroke. When the crank angle is 540 to 720 degrees, cylinder #3 will be undergoing the intake stroke.

As shown in FIG. 2, when the crank angle is 0 to 180 degrees, cylinder #4 will be undergoing the intake stroke. When the crank angle is 180 to 360 degrees, cylinder #4 will be undergoing the compression stroke. When the crank angle is 360 to 540 degrees, cylinder #4 will be undergoing the expansion stroke. When the crank angle is 540 to 720 degrees, cylinder #4 will be undergoing the exhaust stroke.

In this manner, regardless of the crank angle, one of the four cylinders #1 to #4 will be undergoing the compression stroke and another one of the four cylinders #1 to #4 will be undergoing the expansion stroke. In a cylinder that is in the compression stroke or the expansion stroke, the intake valve 40 and the exhaust valve 42 will be closed. Thus, when the motor generator 12 starts the engine 10, the piston 50 inside the cylinder that is in the compression stroke or the expansion stroke will resist movement. In other words, a load will be applied to the motor generator 12. For example, if the motor generator 12 starts driving the engine 10 when the crank angle is 0 degrees, cylinder #1 and cylinder #3 will apply load to the motor generator 12. For example, if the motor generator 12 starts driving the engine when the crank angle is about to reach 180 degrees, cylinder #3 and cylinder #4 will apply load to the motor generator 12 as the crank angle advances beyond 180 degrees.

When the motor generator 12 is able to overcome the load of the cylinder in the compression stroke and the load of the cylinder in the expansion stroke, the motor generator 12 will successfully start the engine 10.

First Starting Process and Second Starting Process

Figure 3:
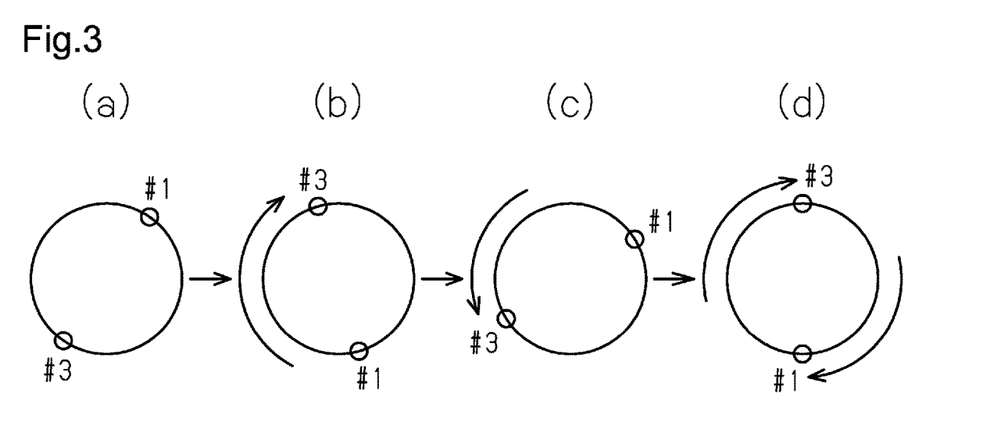
FIG. 3 is a schematic diagram showing movement of cylinders in a first starting process and a second starting process.

FIG. 3 shows a case in which the motor generator 12 successfully starts the engine through a first starting process and a second starting process.

Part (a) of FIG. 3 shows a state in which the crank angle is 45 degrees. When the crank angle is 45 degrees, cylinder #1 is in the expansion stroke and cylinder #3 is in the compression stroke. The motor generator 12 starts driving the engine 10 in the state in which the crank angle is 45 degrees.

Part (b) of FIG. 3 shows a state in which the crank angle is 160 degrees. For example, the compressed air in cylinder #3 causes the engine rotation speed to become less than zero when the crank angle is 160 degrees. Since the engine rotation speed has become less than zero, the controller 34 suspends the supply of power from the high-voltage battery 26 to the motor generator 12.

As the controller 34 suspends the supply of power to the motor generator 12, the crankshaft starts rotating in the reverse direction. Eventually, as shown in part (c) of FIG. 3, the engine rotation speed becomes zero. Part (c) of FIG. 3 shows a state in which the crank angle is 75 degrees.

Then, the controller 34 starts driving the motor generator 12 by supplying power to the motor generator 12. As shown in part (d) of FIG. 3, the crank angle reaches 180 degrees. In this case, the motor generator 12 successfully starts the engine 10.

The process performed from when the motor generator 12 starts driving the engine 10 in the state in which the crank angle is 45 degrees to when the engine rotation speed becomes less than zero corresponds to the first starting process. The process performed after the engine rotation speed becomes less than zero corresponds to the second starting process.

A case in which the engine 10 is successfully started by the first starting process and the second starting process will now be described with reference to FIG. 4.

Figure 4:
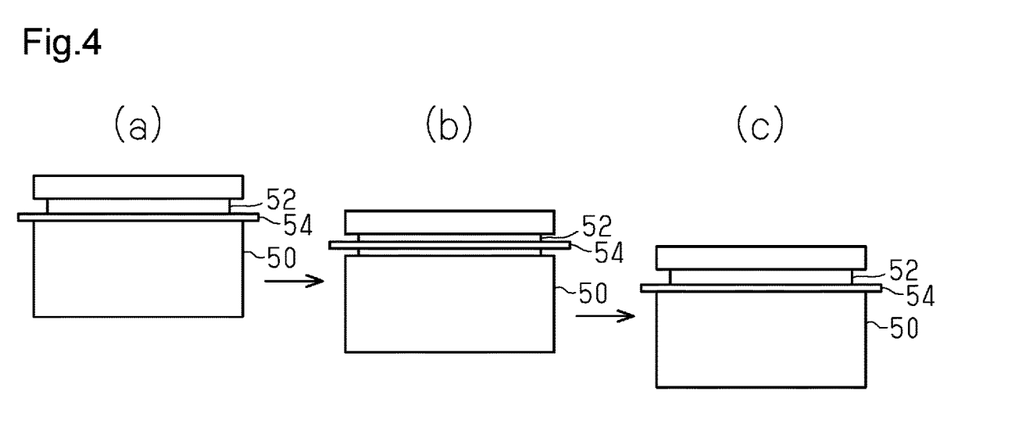
FIG. 4 is a diagram illustrating movement of a piston ring after the second starting process is initiated.

FIG. 4 shows the piston 50 in cylinder #3 during the compression stroke. The piston 50 includes an outer circumferential surface where a ring groove 52 is formed. A piston ring 54 is fitted to the ring groove 52.

The lower part of the piston ring 54 in the ring groove 52 is forced against the piston 50 during a period from when the motor generator 12 starts driving the engine 10 to when the engine rotation speed becomes zero. In this case, the driving force of the motor generator 12 drives the piston 50 toward the upper side in FIG. 4. Also, the pressure of the air in cylinder #3 is applied to the piston ring 54. Therefore, the force acting to press the piston ring 54 toward the lower side in FIG. 4 is applied to the piston ring 54. In this manner, the lower part of the piston ring 54 is forced against the piston 50. In particular, as shown in part (a) of FIG. 4, the lower part of the piston ring 54 is forced against the piston 50 when the engine rotation speed becomes zero.

When the repulsion force produced by the compressed air in cylinder #3 causes the engine rotation speed to become less than zero, the second starting process is initiated. This suspends the supply of power to the motor generator 12. When the supply of power to the motor generator 12 is suspended, the force that drives the piston 50 upward will no longer act on the piston 50. Thus, the repulsion force of the compressed air will press the piston 50 downward.

As shown in Part (b) of FIG. 4, if there is no force that drives the piston 50 upward and the piston 50 is pressed downward as described above, the lower part of the piston ring 54 will separate from the piston 50 immediately after the crankshaft starts rotating in the reverse direction. When the lower part of the piston ring 54 is separated from the piston 50, the compressed air flows out of the combustion chamber 38 through the gap between the inner circumferential surface of the piston ring 54 and the ring groove 52. Eventually, as shown in part (c) of FIG. 4, the lower part of the piston ring 54 will again be forced against the piston 50 such that the compressed air stops flowing out of the combustion chamber 38.

The amount of compressed air in cylinder #3 in the second starting process is decreased from that in the first starting process. Thus, the motor generator 12 is more likely to overcome the load of the cylinder that is undergoing the compression stroke and the cylinder that is undergoing the expansion stroke.

Flowchart of Process Executed by Controller 34

Figure 5:
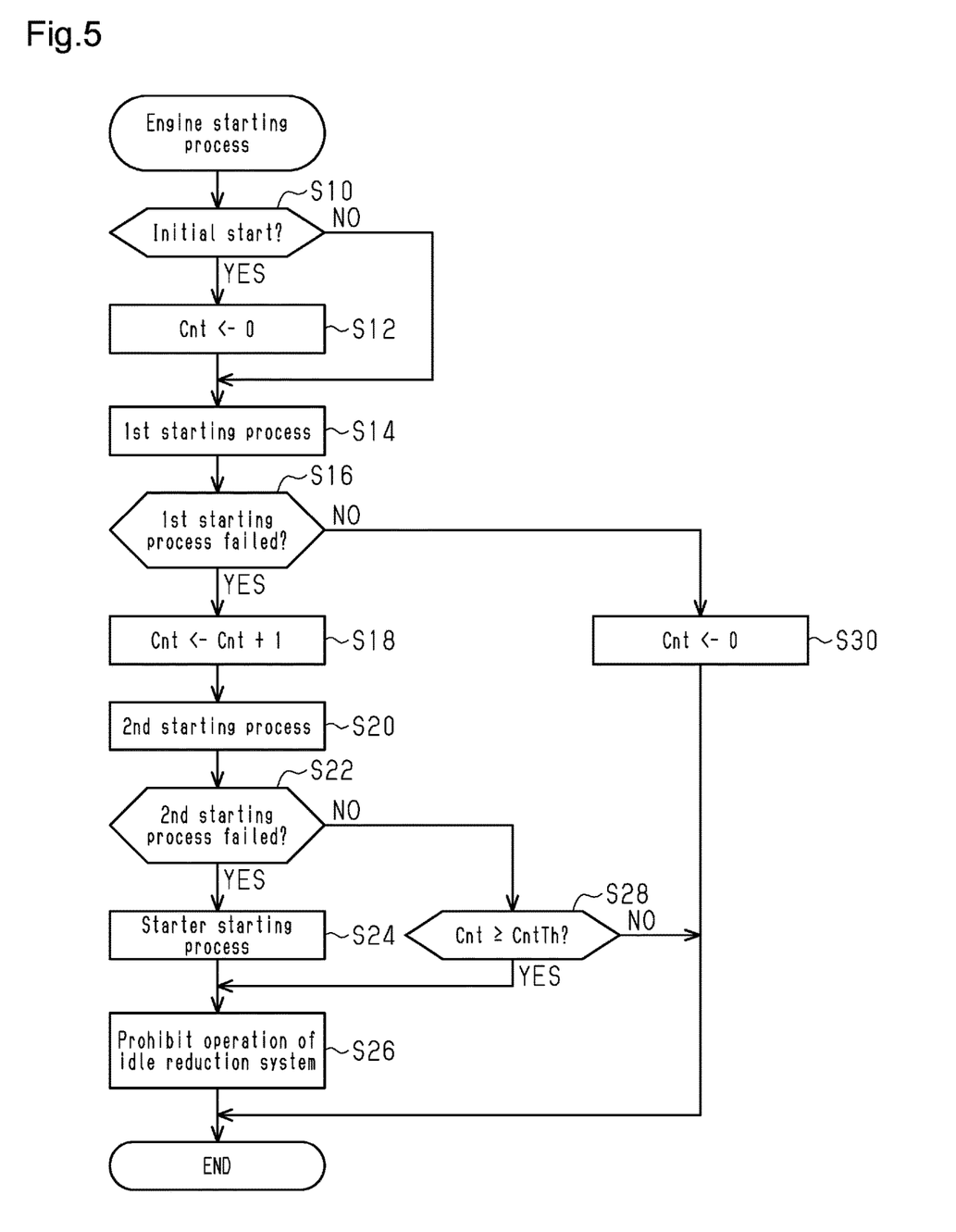
FIG. 5 is a flowchart illustrating a process executed by the controller shown in FIG. 1.

A process executed by the controller 34 will now be described with reference to FIG. 5. When an execution condition for starting the engine 10 is satisfied, the controller 34 executes an engine starting process shown in FIG. 5.

In step S10, the controller 34 determines whether the engine 10 is initially started in the present trip. When an affirmative determination is given in step S10 (step S10: YES), the controller 34 proceeds to step S12. In step S12, the controller 34 sets an occurrence Cnt to zero. The occurrence Cnt will be described later. After step S12, the controller 34 proceeds to step S14. When a negative determination is given in step S10 (step S10: NO), the controller 34 proceeds to step S14.

In step S14, the controller 34 executes the first starting process. The first starting process is a process that drives the motor generator 12 by supplying the motor generator 12 with power from the high-voltage battery 26 to crank the engine 10. The controller 34 determines that the first starting process failed to start the engine 10 when a shifting condition is satisfied. The shifting condition is a logical disjunction condition in which the engine rotation speed, which is the rotation speed of the engine 10, becomes less than zero in the first starting process or the engine rotation speed is maintained at zero for a predetermined period or longer in the first starting process. The controller 34 determines that the engine 10 is successfully started in the first starting process when the engine rotation speed becomes higher than or equal to an engine rotation speed threshold value during the first starting process. The engine rotation speed threshold value is set to allow for determination of whether the motor generator 12 successfully started the engine 10. When the controller 34 determines whether the first starting process succeeded or failed to start the engine 10, the controller 34 ends the first starting process and proceeds to step S16.

When the first starting process has failed to start the engine 10 (step S16: YES), the controller 34 proceeds to step S18. In step S18, the controller 34 increments the occurrence Cnt by one. Specifically, the controller 34 executes a counting process that counts the occurrence Cnt of execution of the second starting process after the first starting process failed to start the engine 10.

After step S18, the controller 34 proceeds to step S20. In step S20, the controller 34 executes the second starting process. The second starting process includes suspending the supply of power from the high-voltage battery 26 to the motor generator 12 and then driving the motor generator 12 by supplying the motor generator 12 with power from the high-voltage battery 26 to crank the engine 10. According to steps S16 and S20, the engine starting process includes the second starting process that is executed when the first starting process failed to start the engine 10.

When the second starting process has failed to start the engine 10 (step S22: YES), the controller 34 proceeds to step S24. The controller 34 determines that the second starting process failed to start the engine 10 when a logical disjunction condition is satisfied. In the logical disjunction condition, the engine rotation speed becomes less than zero in the second starting process or the engine rotation speed is maintained at zero for a predetermined period of time or longer in the second starting process. In step S24, the controller 34 executes a starter starting process. The starter starting process is a process that starts the engine 10 with the starter 20. After step S24, the controller 34 proceeds to step S26. In step S26, the controller 34 prohibits operation of the idle reduction system. According to steps S22, S24, and S26, when the second starting process failed to start the engine 10, the controller 34 starts the engine 10 with the starter 20 and prohibits operation of the idle reduction system of the engine 10.

When the second starting process has successfully started the engine 10 (step S22: NO), the controller 34 proceeds to step S28. The controller 34 determines that the engine 10 is successfully started in the second starting process when the engine rotation speed becomes higher than or equal to the engine rotation speed threshold value during the second starting process. In step S28, the controller 34 determines whether the counted occurrence Cnt is greater than or equal to the determination threshold value CntTh. The determination threshold value CntTh is set to allow for the prediction of a situation in which the second starting process fails to start the engine 10. In the present embodiment, the determination threshold value CntTh is two. When an affirmative determination is given in step S28 (step S28: YES), the controller 34 proceeds to step S26. In step S26, the controller 34 prohibits operation of the idle reduction system. According to steps S22, S26, and S28, when the counted occurrence Cnt is greater than or equal to the determination threshold value CntTh, the controller 34 prohibits operation of the idle reduction system of the engine 10 even if the second starting process successfully started the engine 10. When a negative determination is given in step S28 (step S28: NO), the controller 34 ends the process.

When the first starting process has successfully started the engine 10 (step S16: NO), the controller 34 proceeds to step S30. In step S30, the controller 34 sets the occurrence Cnt to zero. Specifically, the controller 34 executes a first starting resetting process that resets the counted occurrence Cnt when the first starting process successfully started the engine 10. After step S30, the controller 34 ends the process.

Operation of Present Embodiment

When the execution condition for starting the engine 10 is satisfied for the first time after the ignition switch 36 is switched on, the first starting process is executed (step S14). In an example, the first starting process successfully started the engine 10. Then, when an idle reduction system operation condition is satisfied, the engine 10 is stopped.

When the execution condition for starting the engine 10 is satisfied in a state in which the idle reduction system is active, the first starting process is executed (step S14). In an example, this first starting process failed to start the engine 10. In such a case, the second starting process is executed (step S20). In an example, this second starting process successfully started the engine 10. Then, when the idle reduction system operation condition is satisfied, the engine 10 is stopped.

Subsequently, when the execution condition for starting the engine 10 is satisfied again in a state in which the idle reduction system state is active, the first starting process is executed (step S14). In an example, this first starting process failed to start the engine 10. In such a case, the second starting process is executed (step S20). In an example, this second starting process successfully started the engine 10. Thus, the second starting process has been executed twice. According to steps S26 and S28, the controller 34 prohibits operation of the idle reduction system of the engine 10 even through the second starting process successfully started the engine 10.

Since operation of the idle reduction system is prohibited, the engine 10 will not be stopped during the trip unless the ignition switch 36 is switched off. In other words, when operation of the idle reduction system is prohibited, the engine starting process is no longer executed during the trip.

Advantage of Present Embodiment (1) Normally, the first starting process successfully starts the engine 10. When the counted occurrence Cnt of execution of the second starting process is greater than or equal to the determination threshold value CntTh, it is likely that the motor generator 12 will fail to start the engine 10. With the above embodiment, if the counted occurrence Cnt of execution of the second starting process is greater than or equal to the determination threshold value CntTh, operation of the idle reduction system is prohibited even when the second starting process successfully started the engine 10 with the motor generator 12. This allows operation of the idle reduction system to be prohibited before the second starting process actually fails to start the engine 10 by anticipating the situation in which the second starting process fails to start the engine 10. When operation of the idle reduction system is prohibited before the second starting process actually fails to start the engine 10, the engine 10 will not be started with the starter 20.

Therefore, the above embodiment readily reduces the likelihood of a situation in which a loud noise is produced when starting the engine 10 with the starter 20 during a trip.

(2) If the determination threshold value CntTh is too large, it becomes more likely that the second starting process fails. This increases the possibility that the engine 10 is started with the starter 20. In order to reduce a situation in which the starter 20 starts the engine 10, it is preferable that the determination threshold value CntTh be small. In the above embodiment, the determination threshold value CntTh is two. This readily reduces a situation in which the starter 20 starts the engine 10 compared to a configuration in which the determination threshold value CntTh is greater than or equal to three.

Modified Examples

The present embodiment may be modified as follows. The present embodiment and the following modifications can be combined as long as the combined modifications remain technically consistent with each other.

The configuration of the vehicle 100 may be changed. In the above embodiment, the number of the cylinders is four. However, this is merely an example. The number of the cylinders may be changed and may be, for example, six.

The above embodiment is not provided with a clutch that connects and disconnects the engine 10 and the crank pulley 10a. However, a clutch may be arranged between the engine 10 and the crank pulley 10a.

In the above embodiment, the second starting process includes suspending the supply of power from the high-voltage battery 26 to the motor generator 12 and then driving the motor generator 12 by supplying the motor generator 12 with power from the high-voltage battery 26. This is an example of the second starting process that includes reducing the supply of power from the high-voltage battery 26 to the motor generator 12 and then driving the motor generator 12 by increasing the supply of power from the high-voltage battery 26 to the motor generator 12. In other words, the second starting process is not limited to stopping the supply of power and then resuming the supply, but may only reduce the supply of power and then increase the supply. As described above with reference to FIGS. 2 to 4, in the second starting process, the amount of compressed air in the cylinder in the compression stroke is small, and thereby the engine 10 is likely to be started successfully. This is because the amount of compressed air is reduced by rotating the crankshaft in the reverse direction when the shifting condition is satisfied. Accordingly, the supply of power from the high-voltage battery 26 to the motor generator 12 does not have to be suspended immediately after initiation of the second starting process as long as the crankshaft is rotated in the reverse direction when the supply of power from the high-voltage battery 26 to the motor generator 12 is reduced immediately after initiation of the second starting process.

In the above embodiment, the vehicle 100 is provided with the high-voltage battery 26 and the low-voltage battery 28. However, this is merely an example. The vehicle 100 may only include a battery that supplies power to the motor generator 12.

The combustion cycle may be changed. In the above embodiment, air-fuel mixture is ignited in cylinder #1, cylinder #3, cylinder #4, and cylinder #2 in this order. Air-fuel mixture may be ignited in the order of cylinder #1, cylinder #2, cylinder #4, and cylinder #3.

In the above embodiment, the shifting condition is a logical disjunction condition in which the engine rotation speed is less than zero or the engine rotation speed is maintained at zero for a predetermined period or longer. Alternatively, the shifting condition may be a condition in which the engine rotation speed is less than zero. In other words, determination of which the engine rotation speed is maintained at zero for a predetermined period or longer may be omitted. The shifting condition may be a condition in which the engine rotation speed is less than the engine rotation speed threshold value when a threshold period elapses from initiation of the first starting process.

In the above embodiment, step S30 is executed. Thus, the occurrence Cnt of execution of the second starting process, which is compared with the determination threshold value CntTh, is occurrence Cnt of consecutive executions of the second starting process. In other words, the occurrence Cnt of execution of the second starting process is reset when the first starting process successfully starts the engine 10. However, this is merely an example, and step S30 may be omitted. Specifically, the occurrence Cnt of execution of the second starting process may be occurrence Cnt of non-consecutive executions of the second starting process.

In the above embodiment, steps S10 and S12 are executed. Thus, the controller 34 sets the occurrence Cnt to zero when the engine 10 is initially started in a trip. Alternatively, the controller 34 may reset the occurrence Cnt to zero when a trip is ended. In this manner, the controller 34 may execute a trip resetting process that resets the occurrence Cnt when the ignition switch 36 of the vehicle 100 is switched off In the above embodiment, step S10 is executed. Thus, the occurrence Cnt of execution of the second starting process is the occurrence Cnt of execution of the second starting process in a single trip. However, this is merely an example. For example, the occurrence Cnt of execution of the second starting process may be the occurrence Cnt of execution of the second starting process over multiple trips.

In the above embodiment, the determination threshold value CntTh is two. However, this is merely an example. The determination threshold value CntTh may be an integer greater than or equal to two.

In the above embodiment, the determination threshold value CntTh is two. Alternatively, the determination threshold value CntTh may be one. If the determination threshold value CntTh is too large, the second starting process becomes more likely to fail. This increases the possibility that the engine 10 is started with the starter 20. In order to reduce a situation in which the starter 20 starts the engine 10, it is preferable that the determination threshold value CntTh be small. When the determination threshold value CntTh is set to one, a situation in which the starter 20 starts the engine 10 is minimized.

In a modified example, in which the determination threshold value CntTh is set to one, step S28 may be omitted. When a negative determination is given in step S22, the controller 34 may proceed to step S26.

In the above embodiment, the controller 34 includes a central processing unit (CPU), a read-only memory (ROM), and a random-access memory (RAM) and executes software processing. However, this is merely an example. For example, the controller 34 may include a dedicated hardware circuit (e.g., application specific integrated circuit (ASIC)) that executes at least part of the software processing performed in the above embodiment. Specifically, the controller 34 may only have any of the following configurations (a) to (c). (a) The controller 34 includes a processor that executes all processes according to a program and a program storage device such as a ROM that stores the program. In other words, the controller 34 includes a software execution device. (b) The controller 34 includes a processor that executes part of processes according to a program and a program storage. The controller 34 further includes a dedicated hardware circuit that executes the remaining processes. (c) The controller 34 includes a dedicated hardware circuit that executes all processes. There may be more than one software execution device and/or more than one dedicated hardware circuit. Specifically, the above-described processes may be executed by the processing circuitry including at least one of a software execution device and a dedicated hardware circuit. The processing circuitry may include more than one software execution device and more than one dedicated hardware circuit. A program storage device, or computer readable medium, includes any type of medium that is accessible by a versatile computer and a dedicated computer.

Various changes in form and details may be made to the examples above without departing from the spirit and scope of the claims and their equivalents. The examples are for the sake of description only, and not for purposes of limitation. Descriptions of features in each example are to be considered as being applicable to similar features or aspects in other examples. Suitable results may be achieved if sequences are performed in a different order, and/or if components in a described system, architecture, device, or circuit are combined differently, and/or replaced or supplemented by other components or their equivalents. The scope of the disclosure is not defined by the detailed description, but by the claims and their equivalents. All variations within the scope of the claims and their equivalents are included in the disclosure.

What is claimed is:

1. A controller for a hybrid electric vehicle including an engine, a motor generator, a belt connecting the engine, an air-conditioning compressor, and the motor generator, a first battery configured to supply the motor generator with power, a starter configured to start the engine by driving a transmission connected to the engine, and a second battery configured to supply the starter with power, a voltage of the first battery being higher than a voltage of the second battery, the controller comprising:
   processing circuitry configured to execute an engine starting process when an execution condition for starting the engine is satisfied, wherein:
   the engine starting process includes
   determining whether the engine is initially started,
   when it determined that the engine is initially started, setting a counted occurrence to zero,
   executing a first starting process that drives the motor generator by supplying the motor generator with power from the first battery to crank the engine,
   determining whether the first starting process has failed to start the engine when a shifting condition is satisfied,
   when it is determined that the first starting process has not failed to start the engine, setting the counted occurrence to zero,
   when it is determined that the first starting process has failed to start the engine,
      incrementing the counted occurrence by one,
      executing a second starting process that includes reducing the supply of power from the first battery to the motor generator and then driving the motor generator by increasing the supply of power from the first battery to the motor generator to crank the engine,
      determining whether the second starting process has failed to start the engine,
      when it is determined that the second starting process has failed to start the engine, starting the engine with the starter by supplying the starter with power from the second battery to drive the transmission to start the engine, and prohibiting operation of an idle reduction system of the engine, and
   when it is determined that the second starting process has not failed to start the engine
      comparing the counted occurrence to a determination threshold value, and
      prohibiting the operation of the idle reduction system of the engine when the counted occurrence is greater than or equal to the determination threshold value.

2. The controller for a hybrid electric vehicle according to claim 1, wherein the shifting condition is a logical disjunction condition in which an engine rotation speed, which is a rotation speed of the engine, becomes less than zero in the first starting process or the engine rotation speed is maintained at zero for a predetermined period or longer in the first starting process.

3. The controller for a hybrid electric vehicle according to claim 1, wherein the processing circuitry is configured to execute a trip resetting process that resets the counted occurrence when an ignition switch of the hybrid electric vehicle is switched off.

4. The controller for a hybrid electric vehicle according to claim 1, wherein:
   the determination threshold value is an integer greater than or equal to two.

5. The controller for a hybrid electric vehicle according to claim 1, wherein the determination threshold value is two.

6. The controller for a hybrid electric vehicle according to claim 1, wherein the determination threshold value is one.

7. A method for controlling a hybrid electric vehicle including an engine, a motor generator, a belt connecting the engine, an air-conditioning compressor, and the motor generator, a first battery configured to supply the motor generator with power, a starter configured to start the engine by driving a transmission connected to the engine, and a second batter configured to supply the starter with power, a voltage of the first battery being higher than a voltage of the second battery, the method comprising:
   executing an engine starting process when an execution condition for starting the engine is satisfied, wherein the engine starting process includes:
   determining whether the engine is initially started;
   when it determined that the engine is initially started, setting a counted occurrence to zero;
   executing a first starting process that drives the motor generator by supplying the motor generator with power from the first battery to crank the engine;
   determining whether the first starting process has failed to start the engine when a shifting condition is satisfied,
   when it is determined that the first starting process has not failed to start the engine, setting the counted occurrence to zero,
   when it is determined that the first starting process has failed to start the engine,
      incrementing the counted occurrence by one,
      executing a second starting process includes reducing the supply of power from the first battery to the motor generator and then driving the motor generator by increasing the supply of power from the first battery to the motor generator to crank the engine;
      determining whether the second starting process has failed to start the engine,
      when it is determined that the second starting process has failed to start the engine, starting the engine with the starter by supplying the starter with power from the second battery to drive the transmission to start the engine, and prohibiting operation of an idle reduction system of the engine, and
   when it is determined that the second starting process has not failed to start the engine comparing the counted occurrence to a determination threshold value, and prohibiting the operation of the idle reduction system of the engine when the counted occurrence is greater than or equal to the determination threshold value.

8. The controller for a hybrid electric vehicle according to claim 1, wherein the processing circuitry is configured to determine that the second starting process failed to start the engine when a logical disjunction condition is satisfied in which an engine rotation speed, which is a rotation speed of the engine, becomes less than zero in the second starting process or the engine rotation speed is maintained at zero for a predetermined period or longer in the second starting process.

* * * * *